United States Patent [19]

Nishiwaki et al.

[11] 4,212,471
[45] Jul. 15, 1980

[54] DEVICE FOR CUTTING A SOUND GROOVE ON A DISC RECORDING MEDIUM

[75] Inventors: Yoshiro Nishiwaki; Tetsuro Izumi, both of Yokohama, Japan

[73] Assignee: Victor Company of Japan Ltd., Yokohama, Japan

[21] Appl. No.: 25,449

[22] Filed: Mar. 28, 1979

[30] Foreign Application Priority Data

Mar. 31, 1978 [JP] Japan .................................. 53-36550

[51] Int. Cl.² ............................................... G11B 3/44
[52] U.S. Cl. ........................................ 274/38; 274/47
[58] Field of Search ................... 274/38, 47; 315/111.8

[56] References Cited

U.S. PATENT DOCUMENTS 4,105,213   8/1978   Owaki et al. ........................ 274/38

*Primary Examiner*—Charles E. Phillips
*Attorney, Agent, or Firm*—Haseltine, Lake & Waters

[57] ABSTRACT

A device for cutting sound grooves in a disc recording medium has a cutting stylus for recording sound by cutting on the disc recording medium. The cutting stylus comprises a cutting stylus structure of diamond having a cutting part for cutting the disc recording medium while producing a cut chip therefrom. A surface of the cutting stylus structure contacts the chip having been rendered electroconductive to a specific depth by an ion-implantation process.

8 Claims, 2 Drawing Figures

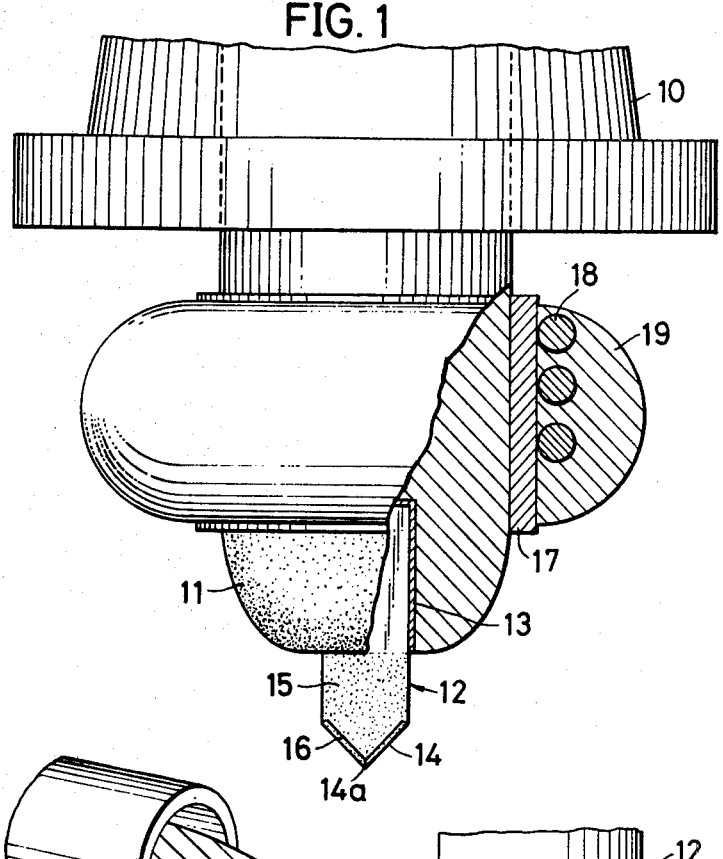
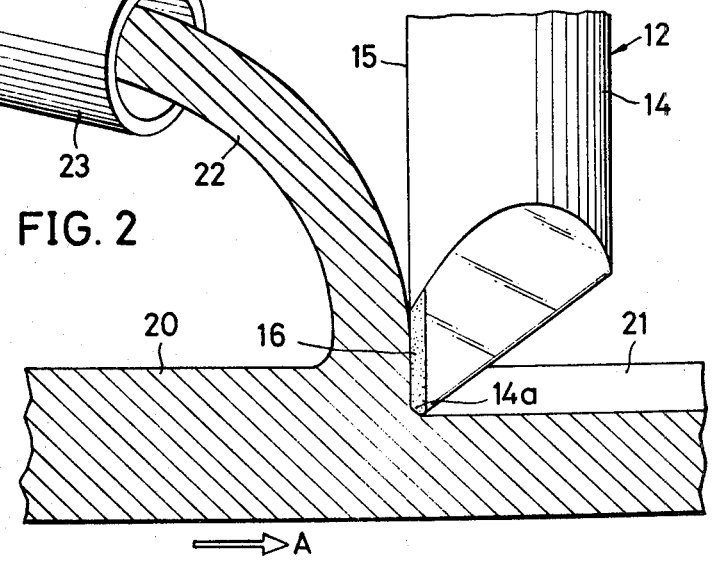

DEVICE FOR CUTTING A SOUND GROOVE ON A DISC RECORDING MEDIUM

BACKGROUND OF THE INVENTION

The present invention relates generally to devices for cutting sound grooves in a disc recording medium. More particularly, the device has excellent recording characteristics since signals are recorded by a cutting stylus, while continuous chips, cut from the original record discs, are prevented from adhering to the groove, the cutting stylus, and other parts, by effectively lessening generation of the static electricity and discharging the static electricity thus generated during the cutting process.

Sound signals are ordinarily recorded on an original record disc coated with a nitrocellulose and alkyd resin base material, that is, a so-called "lacquer disc". Recording involves cutting a groove thereon by means of a device having a cutting stylus. As a material for this cutting stylus, sapphire has heretofore been used. However, a sapphire has a short serviceable life (life time of the order of ten or twenty times of cutting the surface of the original record disc) because it is not very hard and has a relatively rapid wear.

Accordingly, attempts have been made to use a harder diamond, in place of a sapphire, for the cutting stylus. The life of a diamond cutting stylus is undoubtedly very long, because of the hardness of diamond. However, it has been found that a diamond stylus generates more static electricity during recording than a sapphire generates, since diamond is a carbonaceous material. For a diamond stylus, different kinds of electrostatic charges accumulate on the confronting surfaces of the continuous chip and the cutting stylus and on the confronting surfaces of the chip and the groove after cutting. When such a great quantity of static electricity is generated, the resulting coulomb force causes the chip to adhere to the cutting stylus and the cut groove of the lacquer disc. It is difficult to remove this chip, even by means of a vacuum suction, which has been used heretofore.

When the chip adheres to the cutting stylus and the lacquer disc, the cutting function is impaired. For this reason, cutting styluses employing diamond tips have not been used heretofore.

Accordingly, in order to overcome the above described difficulties, we have previously proposed and practiced a cutting device having a grounded electroconductive material thin plate on the mirror surface of a diamond stylus. In accordance with this previous cutting device, the chip produced at the time of cutting is guided into contact with the electroconductive material thin plate. The electrostatic charge accumulated on the chip escapes to ground by way of the electroconductive material thin plate, thereby preventing static electricity.

However, after this cutting stylus has been used a great number of times, the electroconductive material thin plate becomes worn by abrasion and/or it peels off from the diamond cutting stylus structure. This gives rise to the drawback of short serviceable life.

Accordingly, with the aim of further over coming the problems of the above mentioned, previously proposed device, we have previously proposed and practiced a device for cutting sound grooves in disc recording mediums as disclosed in U.S. Pat. No. 4,105,213. This device is organized, based on the consideration on the principle by which static electricity is generated when two objects of different compositions come into mutual contact and then separate. The device uses a structure made of a substance, such as a corundum, which does not readily generate static electricity. This substance is adhered to the mirror surface of the diamond stylus proper. The chip cut from the original record disc comes into contact with and is guided by this structure, which does not readily generate static electricity. According to this device, although diamond is used for the cutting stylus structure, static electricity is not easily generated, whereby the problem of adhering of the cutting chip to parts such as the cutting stylus does not readily occur, and greatly improved results were achieved.

However, even in this device, since a substance which does not readily generate static electricity is caused to adhere to the diamond cutting stylus structure, this substance peels and falls off from the cutting stylus structure after the cutting stylus has been used a great number of times. Particularly in the device of a construction wherein a recess is provided at the tip part of the mirror surface of the cutting stylus structure, and a small piece of sapphire is embedded in this recess, the separation of the sapphire from the cutting stylus structure does not readily occur, but, on the other hand, the fabrication is difficult and gives rise to high cost. Furthermore, as the tip of the cutting stylus becomes worn through abrasion, the tip part is chipped, and the small piece of sapphire also drops off. As a net result, the serviceable life of the cutting stylus is not very long. The serviceable life of this device has been found to be of an order such that it can withstand the cutting of from 50 to 100 faces of original record discs.

Accordingly, the present invention comtemplates the provision of a record groove cutting device of a novel organization by which the generation of static electricity is suppressed, and, at the same time, any static electricity which is generated is discharged to ground (earth) without attaching a small piece, thin plate, or the like of a substance different from the diamond cutting stylus structure to the cutting stylus structure as in the above described two devices previously proposed and practised.

Accordingly, it is a general object of the present invention to provide a novel and useful device for cutting a sound groove on a disc recording medium, in which the above described problems have been solved.

Another and specific object of the invention is to provide a device for cutting a sound groove in a disc recording medium which device has a cutting stylus of a construction wherein at least the mirror surface of the diamond cutting stylus structure has been subjected to an ion implantation process, and the mirror surface has been rendered electroconductive. In the device of the invention, since the mirror surface of the cutting stylus has been made conductive, there is little generation of static electricity even when the cut chip rubs against the mirror surface. Furthermore, since any electrostatic charge which is generated is permitted to escape toward ground, the adhering of the chip due to static electricity to the cutting stylus, the cut groove of the original disc, and other parts is prevented. Still another advantageous feature of this device is that, since ions have been implanted to a specific depth in the surface portion of the cutting stylus structure, there are no undesirable occurrences such as peeling, dropping off, or disappearance of a thin plate or small piece of an electroconductive material, a substance which does not readily generate static electricity, and the like from the cutting stylus as in the aforedescribed proposed device.

Other objects and further features of the invention will be apparent from the following detailed description with respect to preferred embodiments of the invention when read in conjunction with the accompanying drawings.

BRIEF DESCRIPTION OF THE DRAWINGS

In the drawings, in which the figures are greatly enlarged:

FIG. 1 is a front elevation, partly in vertical section, showing one embodiment of a device for cutting a sound groove on a disc recording mediums according to the present invention together with one embodiment of a cutting stylus; and FIG. 2 is a side elevation showing the essential parts of the device illustrated in FIG. 1 in the state of operation.

DETAILED DESCRIPTION OF THE INVENTION

Referring to FIG. 1, an aluminum shank 10 is mounted on a cantilever of a cutter head of the cutting device for holding a titanium stylus supporting rod 11 which is inserted at its root end into the shank 10. The outer end of the stylus supporting rod 11 has a longitudinal central hole therein for receiving a cutting stylus 12 which is bonded thereto by an adhesive 13 (for instance, silver solder containing 30 percent of copper and 70 percent of silver).

The cutting stylus 12, in its state of being held by the above described stylus supporting rod 11, is subjected at its mirror surface 15 and varnishing surfaces 16 to an ion implantation process described hereinafter. As a result, the mirror surface 15 and the varnishing surfaces 16 are rendered electroconductive to a specific depth.

The stylus supporting rod 11 is girdled by a sapphire ring 17 which is fitted thereon. A heater coil 18 is wound around the outer cylindrical surface of the sapphire ring 17, and the outer surfaces of the ring 17. The heater coil 18 is covered by a heat resisting cement structure 19.

As shown in FIG. 2, the cutting portion 14a is cutting a lacquer disc (original disc) 20 which rotates in the arrow direction A. Cutting is carried out by the mirror surface (cutting face) 15 of the cutting stylus 12 at the front surface in the advancing direction. In this cutting operation, an electrical signal is converted into a mechanical vibration by a driving system (not shown) which includes a driving coil. The vibrations are transmitted by way of the cantilever, the shank 10, and the stylus supporting rod 11 to the cutting stylus 12. The cutting portion 14a of the stylus cuts and forms a cut sound groove 21 in a shape which conform to the signal to be recorded.

As this groove 21 forming proceeds, a chip 22 is produced from the disc 20. This chip 22 slides in rubbing contact across the mirror surface 15 of the cutting stylus 12, by which it is guided. Thereafter, it is removed by a suction nozzel 23 of a vacuum suction device. Since the mirror surface 15 of the cutting stylus at this time has been rendered electroconductive by the ion implantation process, only a small quantity of static electricity is generated in the chip 22 even when the chip 22 rubs and slides against the mirror surface 15.

Furthermore, any static electricity which is generated is caused to escape through the mirror surface 15, the stylus supporting rod 11, the shank 10, and the cantilever to ground. In actual practice, therefore, an accumulation of an electrostatic charge on the cutting stylus structure 14 and the cut chip 22 is prevented.

Therefore, the chip 22 is positively drawn away into the suction nozzle 23 and it does not adhere to both the cutting stylus 12 and the cut sound groove 21. Therefore, a good sound recording is accomplished by cutting.

Next, the ion implantation processing of the mirror surface 15 of the cutting stylus structure 14 of the cutting stylus 12 will be described. In the case where a natural diamond of type IIb is used as the diamond cutting stylus structure 14, it is a diamond of a relatively low value of electrical resistance of $10^{13}$ $\Omega$/cm. among diamonds, but a diamond of type IIb is produced in small quantity and is of extremely high price, whereby it is not practical. Accordingly, in the present invention, a diamond other than a type IIb diamond, which has a relatively high electrical resistance (of $10^{16}$ $\Omega$/cm. or higher) can be used for the cutting stylus structure 14.

According to the present invention, the diamond cutting stylus structure 14, in its state of being held by the stylus supporting rod 11, is placed in the sample chamber of an ion-implantation apparatus. An ion-implantation apparatus of known construction is used. As one example of practice of the invention, aluminum ions are implanted to a depth of approximately 3 $\mu$m, for example, in the mirror surface 15 and the varnishing surface 15 of the cutting stylus structure 14 with an ion acceleration voltage of the order of 100 KeV. By this process, the physical properties of the mirror surface 15 and the varnishing surface 16 of the cutting stylus structure 14 are varied to the above stated depth, and these parts of the cutting stylus structure exhibit electroconductivity.

The ions thus implanted in order to impart electroconductivity to the diamond are not limited to those of aluminum, ions of semimetals, semiconductors, and metals such as boron (B), chromium (Cr), nickel (Ni), copper (Cu), gold (Au), silver (Ag), and carbon (C) being also usable.

Furthermore, the depth of ion implantation can be controlled by suitably adjusting the ion implantation energy. While the optimum ion acceleration voltage varies depending on the kind of ion and the depth of implantation, a desirable value thereof is in the range of 25 to 300 KeV, for example, a value of the order of 100 KeV. The reason for this is that an ion acceleration voltage less than 25 KeV will result in an insufficient implantation depth, while an ion acceleration voltage exceeding 300 KeV will give rise to destruction of the crystal lattice of the diamond.

The quantity of ions implanted is selected in a range of $10^{15}$ to $10^{17}$ ions/cm$^2$., preferably at a value of the order of $1 \times 10^{16}$ ions/cm$^2$. The ion implantation depth is selected in a range of 0.1 to 5 $\mu$m, preferably at a value of the order of 3 $\mu$m.

As a result of the above described ion-implantation process in actual instances of practice, the electrical resistance of the mirror surface 15 of the diamond cutting stylus structure 14 decreased to values of $10^2$ to $10^9$ $\Omega$/cm., in contrast to a value of $10^{16}$ $\Omega$/cm. prior to ion implantation.

In accordance with the present invention, other substances are not caused to adhere to the mirror surface 15 of the diamond cutting stylus structure 14, but this surface itself is caused to become electroconductive by ion implantation. For this reason, the serviceable life of this cutting stylus, in comparison with that of the previously proposed cutting stylus described hereinbefore, is remarkably prolonged. As a result, the diamond cutting stylus of the invention is capable of cutting sound grooves in 200 to 400 faces of original record discs.

It has been found that the above described ion-implantation processing of the mirror surface 15 produces almost no change in the degree of coarseness of the surface as compared to that prior to the ion-implantation process, and this process has no adverse effect on the cutting of the original disc. Furthermore, there is no impairment whatsoever of the strength of the cutting stylus structure 14 due to the ion-implantation process. For this reason, there is no chipping of the tip of the cutting stylus structure 14 during its operation in cutting an original disc.

As the cutting stylus according to the invention is used a large number of times to cut original discs, the mirror surface 15 at the tip part of the cutting stylus structure 14 becomes worn until, finally, this wear due to abrasion progresses to the deepest part of the mirror surface 15 affected by the ion implantation. At this point, the electroconductivity of the mirror surface 15 is lost, and this means the life end of the stylus. However, by carrying out the ion-implantation process again on the mirror surface 15, it can once more be rendered electroconductive and, hence, usable again.

Further, this invention is not limited to these embodiments but various variations and modifications may be made without departing from the scope of the invention.

What is claimed is:

1. A device for cutting sound grooves in a disc recording medium, said device having a cutting stylus for recording sound by cutting on the disc recording medium, said cutting stylus comprising a cutting stylus structure of diamond having a cutting part for cutting the disc recording medium while producing a cut chip therefrom, at least a surface of the cutting stylus structure contacting the chip having been rendered electroconductive to a specific depth by an ion-implantation process.

2. A device as claimed in claim 1 in which the cutting stylus structure has a mirror surface which contacts the chip during cutting operation, and at least the mirror surface has been implanted with ions of a substance selected from the group consisting of semiconductors, semimetals, and metals.

3. A device as claimed in claim 2 in which the ions are ions selected from the group consisting of ions of aluminum, boron, chromium, nickel, copper, gold, silver, and carbon.

4. A device as claimed in claim 1 wherein the ion-implantation process has been carried out at an acceleration voltage of 25 to 300 KeV to implant ions into said surface of the cutting stylus structure.

5. A device as claimed in claim 1 wherein ions have been implanted in a quantity of $10^{15}$ to $10^{17}$ ions/cm$^2$. in said surface by the ion-implantation process.

6. A device as claimed in claim 1 wherein ions have been implanted to a depth of 0.1 to 5 $\mu$m in said surface by the ion-implantation process.

7. A device as claimed in claim 1 wherein ions of aluminum have been implanted in a quantity of approximately $1 \times 10^{16}$ ions/cm$^2$. to a depth of approximately 3 $\mu$m into the cutting stylus structure at said at least one surface by the ion-implantation process carried out at approximately 100 KeV.

8. A device as claimed in claim 1 including a supporting member made of an electroconductive material for supporting the cutting stylus structure and means for grounding the supporting member.

* * * * *